US012589875B2

(12) United States Patent　　　(10) Patent No.:　US 12,589,875 B2

Beever et al.　　　　　　　　　　(45) Date of Patent:　Mar. 31, 2026

---

(54) SMART WINDOW SYSTEM

(71) Applicant: EMBRAER S.A., São José dos Campos—SP (BR)

(72) Inventors: Jay Beever, São José dos Campos—SP (BR); Bruno Kimura Castanha, São José dos Campos—SP (BR); Joshua Rea, São José dos Campos—SP (BR); Sergio Raphael Affonso, São José dos Campos—SP (BR); Hugo Motoyama, São José dos Campos—SP (BR); Carlos Leonardo Dolcinotti, São José dos Campos—SP (BR); Fernando Henrique Da Silva, São José dos Campos—SP (BR); Flavio Tobias Goncalves, São José dos Campos—SP (BR); Silvio Hideo Lemos Mochiduky, São José dos Campos—SP (BR); Chase Davis, São José dos Campos—SP (BR); Rainer Zierer, São José dos Campos—SP (BR); Carlos Eduardo De Carvalho, São José dos Campos—SP (BR); Oliver Turci, São José dos Campos—SP (BR)

(73) Assignee: EMBRAER S.A., São José dos Campos—SP (BR)

( * ) Notice: Subject to any disclaimer, the term of this patent is extended or adjusted under 35 U.S.C. 154(b) by 0 days.

(21) Appl. No.: 18/889,158

(22) Filed: Sep. 18, 2024

(65) Prior Publication Data

US 2025/0100683 A1　　Mar. 27, 2025

Related U.S. Application Data

(63) Continuation-in-part of application No. 29/912,755, filed on Sep. 22, 2023.

(Continued)

(51) Int. Cl.
　　*B64D 11/00*　　　(2006.01)
　　*B64C 1/14*　　　(2006.01)
　　　　　　　(Continued)

(52) U.S. Cl.
　　CPC ........... *B64D 11/00* (2013.01); *B64C 1/1484* (2013.01); *G06T 11/60* (2013.01); *H04N 7/181* (2013.01);
　　　　　　　(Continued)

(58) Field of Classification Search
　　None
　　See application file for complete search history.

(56) References Cited

U.S. PATENT DOCUMENTS

2004/0217976 A1　　11/2004　Sanford
2013/0169807 A1　　7/2013　de Carvalho et al.
　　　　　　　(Continued)

OTHER PUBLICATIONS

International Search Report issued in PCT/BR2024/050431 dated Dec. 14, 2024.

*Primary Examiner* — Aneeta Yodichkas
(74) *Attorney, Agent, or Firm* — Nixon & Vanderhye PC

(57)　　　　　ABSTRACT

Advancements in executive aircraft interior design explicitly address the limitations of traditional physical windows within aircraft cabins. The passenger experience is transformed by integrating advanced hybrid technology, replicating expansive exterior views, fostering a sense of connection to the surroundings, and an immersive travel experience through a mimetic virtual display.

23 Claims, 11 Drawing Sheets

Smart window – full window simulation with interactive user interface

Related U.S. Application Data

(60) Provisional application No. 63/584,611, filed on Sep. 22, 2023.

(51) Int. Cl.
| | |
|---|---|
| *G06F 3/041* | (2006.01) |
| *G06T 11/60* | (2006.01) |
| *H04N 7/18* | (2006.01) |

(52) U.S. Cl.
CPC ...... *B64D 2011/0061* (2013.01); *G06F 3/041* (2013.01); *G06T 2200/24* (2013.01); *G06T 2210/62* (2013.01)

(56) References Cited

U.S. PATENT DOCUMENTS

| | | | |
|---|---|---|---|
| 2014/0085337 A1 * | 3/2014 | Velten | G09G 5/14 |
| | | | 345/635 |
| 2015/0170604 A1 * | 6/2015 | Iwagaki | B64D 11/00 |
| | | | 345/589 |
| 2016/0325836 A1 | 11/2016 | Teo | |
| 2017/0094167 A1 | 3/2017 | Riedel | |
| 2018/0081615 A1 | 3/2018 | Riedel | |
| 2018/0352196 A1 | 12/2018 | Marin-Martinod | |
| 2019/0047709 A1 | 2/2019 | Grant | |
| 2020/0151426 A1 | 5/2020 | Kohlmeier-Beckmann | |

* cited by examiner

Smart window – full window simulation with interactive user interface

Smart window – regular window simulation (mimetic panel)

Smart window – full window simulation

System Diagram (non-limiting embodiment)

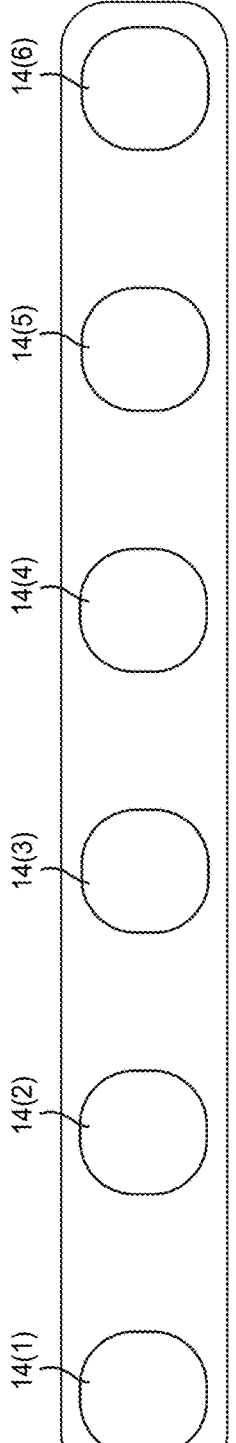
FIG. 5 Sidewall – traditional window configuration – (prior art)
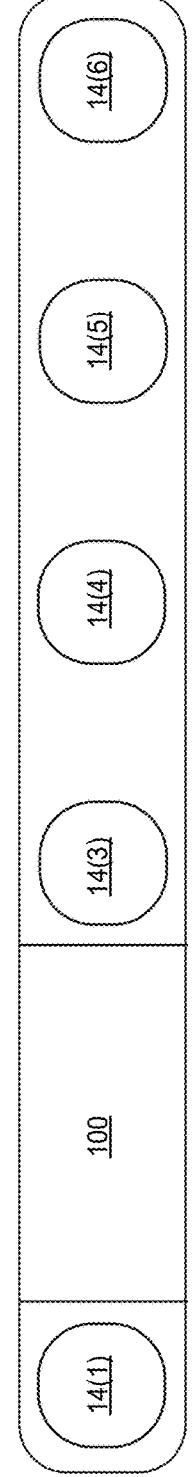
FIG. 6 Sidewall with one virtual window.
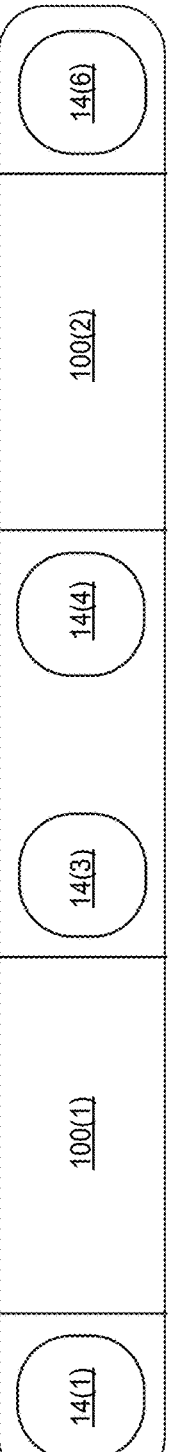
FIG. 7 Sidewall with two virtual window.
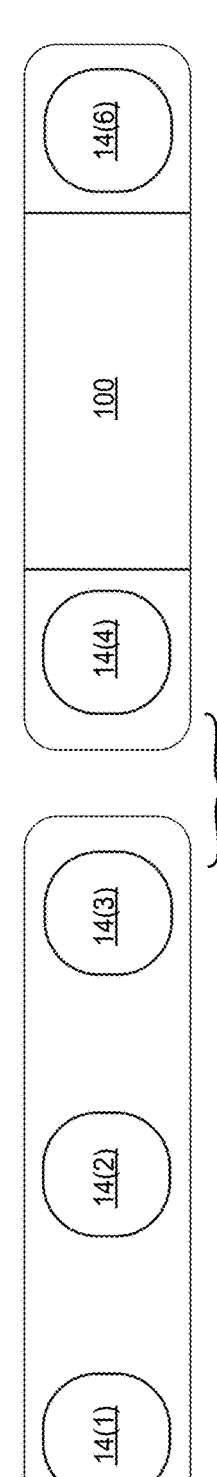
FIG. 8 Sidewall (divided into 2 subpanels) with one virtual window.

Sidewall with one smart window (turned off) together with a club seat arrangement Sidewall with one smart window
(providing regular window simulation – "mimetic functionality")
together with a club seat arrangement

12

14(6)

(Virtual Window conformal with this curve)

SMART WINDOW SYSTEM

CROSS-REFERENCE TO RELATED APPLICATIONS

The present application claims the benefit of U.S. Provisional Patent Application No. 63/584,611 filed Sep. 22, 2023; and is a continuation-in-part of U.S. Design application Ser. No. 29/912,755 filed Sep. 22, 2023. The contents of each of these prior applications is expressly incorporated by reference in their entirety and for all purposes.

FIELD

The technology herein relates to aeronautical user interfaces and, more particularly, to systems and methods to provide passengers with views of the flight of an aircraft through a virtual window.

BACKGROUND

Aircraft windows such as shown in prior art FIG. 5 have long served as conduits for natural light and exterior views, enriching the in-flight experience for passengers. However, traditional aircraft windows face constraints regarding maximum size, usability enhancement, feature integration, and the exploration of novel technologies to expand their utility beyond the ordinary.

Current windows are typically subject to severe limitations in size due to the necessity for structural reinforcement. The resultant weight and cost increases, especially concerning business aviation, have been prohibitive factors preventing the expansion of window dimensions.

In particular, airplane windows are made from special materials that are strong and resistant to impacts, such as bird strikes or debris. Airplanes are designed to maintain their structural integrity even under extreme conditions such as high altitude, rapid cabin pressurization, and temperature changes. By keeping the windows relatively small, their strength and ability to withstand such incidents are enhanced. Any aircraft fuselage structure must be capable of withstanding many types of loads, and stress concentrations near cutouts are of particular concern. The windows on an aircraft are part of the fuselage, and making them larger may weaken the overall structure. The size of cutout windows is carefully balanced with the structural requirements to ensure the aircraft's safety and durability. The smaller size of airplane windows helps maintain the desired aerodynamic shape, contributing to the aircraft's overall performance. The smaller size of airplane windows also helps in preserving cabin pressurization. Larger windows may present challenges in maintaining structural integrity and preventing pressure leaks. Current window sizes allow for effective sealing and ensure the cabin remains pressurized at high altitudes.

While advanced materials have recently enabled some aircraft manufactures to increase window size (e.g., to 10.7 inches×18.4 inches on some jumbo jets), enlarged windows do not solve the problem of providing passengers with timely safety and other information. While these windows connect to the outside environment, their potential for additional functionalities has not been fully explored. Currently, passengers are presented with a multitude of interfaces to access various information within the cabin. This includes In-Flight Entertainment (IFE) controls, flight information, travel status updates, as well as environmental conditions. A unified interface would be a significant improvement.

SUMMARY

In one embodiment, an aircraft comprises a first window providing a view from within an aircraft interior, the first window formed by a first cutout through an aircraft fuselage; a virtual window providing a view from within the aircraft interior, the virtual window comprising a display; and processing circuitry connected to the virtual window, the processing circuitry controlling the virtual window to display user interface with informative content and cabin controls; the virtual window also comprising a touchscreen and the virtual window is curved and conformal to a sidewall panel within the aircraft interior.

The informative content and cabin controls comprise information such as destination time, external and internal temperatures, flight altitude, speed, wind conditions, and key cabin controls derived from the Cabin Management System and In-Flight Entertainment system.

The virtual window being a mimetic window and the processing circuitry controlling the virtual mimetic window to mimic a non-existent second window representing a real window that would be formed by a second cutout through the aircraft fuselage.

The virtual window may be disposed adjacent the first window and the processing circuitry is configured to control the virtual window to display objects and/or views that can be seen through the first window.

A camera may be disposed on the aircraft, the camera capturing external images, the processing circuitry controlling the virtual window to display images based on the images captured by the camera.

A graphics generator may be disposed on the aircraft, the graphics generator generating images of objects that could be seen through the first window, the processing circuitry controlling the virtual window to display images based on the images generated by the graphics generator.

A graphics generator may be disposed on the aircraft, the graphics generator generating images of objects and/or view that could be captured by an external camera, the processing circuitry controlling the virtual window to display images based on the images generated by the graphics generator.

The processing circuitry may comprise a graphics generator that generates a user interface and superimposes the user interface on the virtual window.

The virtual window may provide a display that mimics or imitates what could be seen through a second window formed by a second cutout through the aircraft fuselage.

The virtual window may provide an active display area that is shaped and sized to match the first window.

Structure defining the virtual window is not transparent and the virtual window mimics transparency.

The virtual window may be disposed on a sidewall panel between the first window and a third window providing a view from within the aircraft interior, the third window formed by a third cutout through the aircraft fuselage, and the virtual window mimics what would be seen through a window between the first window and the third window. The sidewall region between the first window and the third window may have a real (physical) window. So, the virtual window is disposed over the real (physical) window.

In another embodiment for use in an aircraft comprising a first window providing a view from within an aircraft interior through a first cutout through an aircraft fuselage, a virtual window comprises a display configured to provide a view from within the aircraft interior, the virtual window mimicking a further window formed by a further cutout through the aircraft fuselage.

The virtual window is configured to be disposed adjacent the first window to display the same objects that can be seen through the first window.

A camera disposed on the aircraft captures external images, the virtual window configured to display images based on the images captured by the camera.

A graphics generator generates images of objects or views that could be seen through the first window or that could be captured by an external camera, the virtual window configured to display images generated by the graphics generator.

The virtual window generates and displays a superimposed user interface.

The virtual window provides a display that mimics or imitates what could be seen through a second window formed by a second cutout through the aircraft fuselage.

The virtual window provides a display that mimics or imitates what could be seen through an external camera.

The virtual window comprises a curved touchscreen conformal to a sidewall panel within the aircraft interior.

The virtual window provides an active display area that is shaped and sized to match the first window.

Structure defining the virtual window is not transparent and the virtual window mimics transparency.

The virtual window is configured to be disposed on a sidewall panel between the first window and a second window providing a view from within the aircraft interior, the second window formed by a second cutout through the aircraft fuselage, the virtual window configured to mimic what would be seen through a window between the first window and the second window. The sidewall region between the first window and the second window does not have any real (physical) window.

BRIEF DESCRIPTION OF THE DRAWINGS

FIG. 5 shows a sidewall including a traditional prior art window configuration.

FIG. 6 shows a sidewall with a virtual window and traditional windows.

FIG. 7 shows a sidewall with two virtual windows and traditional windows.

FIG. 8 shows a sidewall divided into 2 subpanels with a virtual window in one of the panels.

DETAILED DESCRIPTION OF NON-LIMITING EMBODIMENTS

Figure 1:
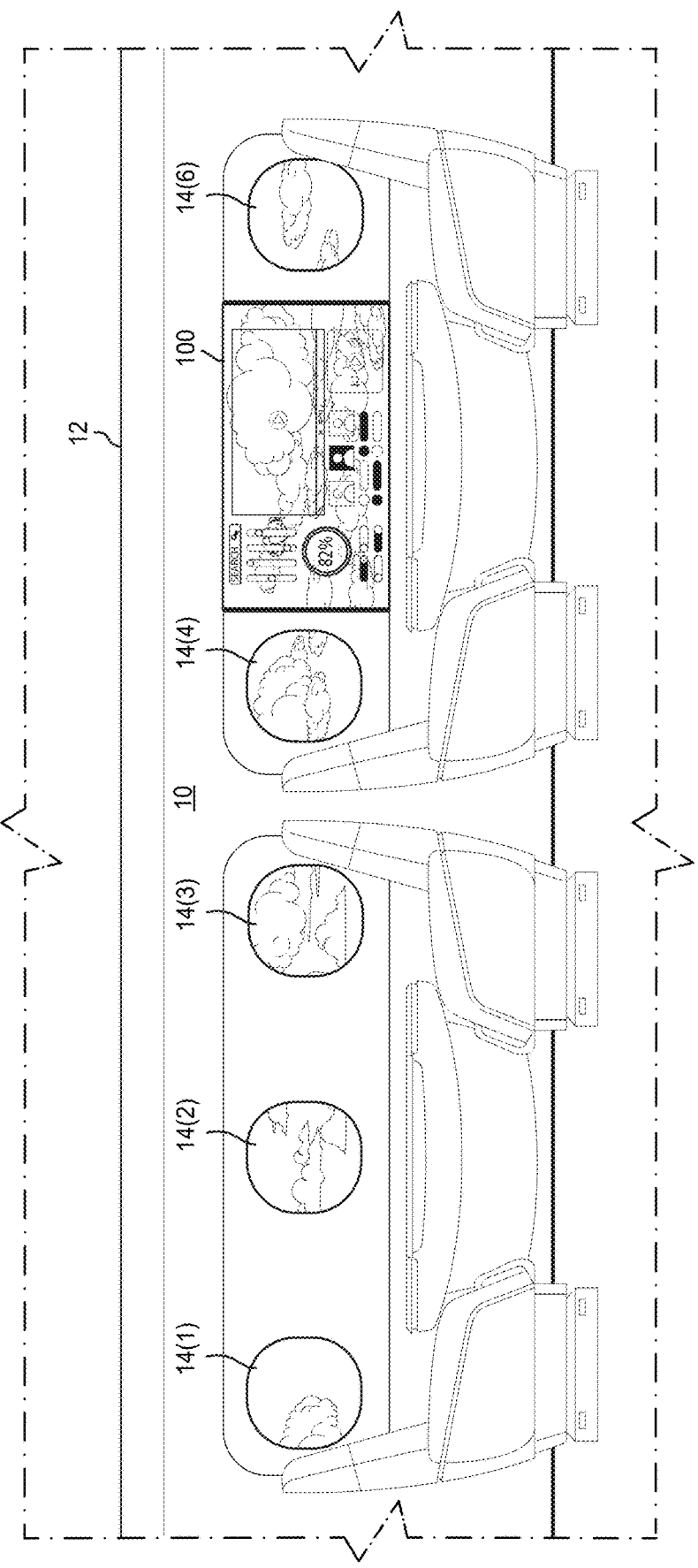
FIG. 1 shows an aircraft interior including a smart window providing a full window simulation with an interactive user interface.

The above limitations inform a new approach to redefining the passenger's interaction with the aircraft environment and the surrounding vistas. The present technology aims to bridge the gap between conventional window functionalities and the evolving demands for enriched passenger engagement during flights. By capitalizing on existing interfaces while introducing innovative hybrid window technology, this technology elevates the in-flight experience to unprecedented immersion, comfort, and utility levels.

The present technology pertains to advancements in executive aircraft interior design, explicitly addressing the limitations of traditional physical windows within such aircraft cabins. The present technology seeks to transform the passenger experience by integrating advanced hybrid technology, replicating expansive exterior views, fostering a sense of connection to the surroundings, and an immersive travel experience.

According to aspects of the present technology, hybrid technology means the installation of one or more virtual windows (electronic displays) in the passenger cabin of the aircraft adjacent to an actual traditional window so that the passengers will use both windows.

Example embodiments introduce a novel hybrid window system that seamlessly blends with the aircraft interior, coexisting with physical windows and its surroundings while incorporating a touch display (virtual window) with multiple layers of informative content. This encompasses flight information such as destination time, external and internal temperatures, flight altitude, speed, wind conditions, and key cabin controls derived from the Cabin Management System and In-Flight Entertainment system. This fusion enables passengers to enjoy panoramic visuals and interact seamlessly with the flight journey.

Furthermore, the example technology involves the integration of these displays into the curvature of the aircraft's fuselage, enabling a harmonious blend with cabin interior elements for optimal functionality and easy maintenance.

An integral achievement of example embodiments is its creation of hybrid scenarios by combining virtual and real windows, delivering the benefits of both realms. This effort amalgamates diverse fields, ranging from aerospace engineering to human-computer interaction, interior design, and avionics, all converging to redefine the executive aircraft passenger experience.

This technology presents a groundbreaking innovation in executive aircraft interior design, specifically targeting the limitations associated with traditional physical cabin windows. The primary objective is to elevate the passenger experience by harnessing advanced hybrid technology to replicate expansive external views, fostering a more profound connection with the surroundings, and creating an immersive travel journey.

As mentioned above, provided at least some embodiments of this innovation is a novel hybrid window system, meticulously integrated within the aircraft's interior alongside conventional physical windows. This system incorporates a touch display overlaying critical flight data, encompassing parameters such as destination times, internal and external temperatures, flight altitude, speed, wind conditions, and essential cabin controls sourced from the Cabin Management System and In-Flight Entertainment system. This seamless amalgamation empowers passengers to embrace panoramic views while effortlessly engaging with the flight progression.

The system's functionality works with multiple exterior cameras that transmit real-time images to the touch display. These cameras offer diverse perspectives of the aircraft's external surroundings, thereby establishing a tangible connection with the external environment.

Furthermore, the system's design meticulously aligns with the aircraft's fuselage curvature, ensuring a harmonious integration with the cabin's interior components. Additionally, this system is seamlessly incorporated into the club seating layout, further contributing to a comprehensive and immersive cabin ambience.

Example non-limiting embodiments introduce several functionalities that enhance the overall passenger experience. Therefore, embodiments of a SMART WINDOW SYSTEM comprises the following functionalities:

Touch Passenger Control Command Unit: The intuitive touch passenger command unit (implemented in the electronic display of the virtual window) enables passengers to interact with their immediate surroundings, controlling lighting, climate settings, seating preferences, and pertinent CMS (Cabin Management System) functions.

The touch capability will be facilitated by an external layer covering the entire screen area, enabling the device to interact fully with passengers.

Embodiments may comprise alternative interface with Smart Window through gesture control, eye tracking control, voice command and touch control systems other than window surface. This will be achieved by integrating different systems into the Smart Window, allowing for seamless integration, connectivity, and complete control of the Smart Window system functionalities.

Dynamic Placards and Ordinance Signs: Throughout the cabin, stationary placards dynamically display real-time flight status updates, seat configurations, and other pertinent information, ensuring passengers remain informed and oriented.

These placards will be projected at various positions within the smart window, visually guiding passengers through mandatory flight procedures or other instructions using graphics and potentially employing animations for illustration. The dynamic nature of these placards allows for adaptability to different languages and cultural contexts.

Flight Info Integration: Critical flight information, encompassing altitude, speed, and estimated arrival time, seamlessly integrates into the passenger experience through the touch command unit or designated displays.

The cabin management system will receive real-time flight information from the aircraft's avionics and utilize the display of the virtual window to convey this flight experience data to passengers visually.

Immersive Entertainment: Cabin windows are transformed into interactive displays for in-flight entertainment, offering passengers diverse entertainment options for a captivating travel experience.

Utilizing the flight data, the system can present points of interest, provide information, offer movies and news, and deliver various views, including virtual reality perspectives, through seamless software integration.

Figure 3:
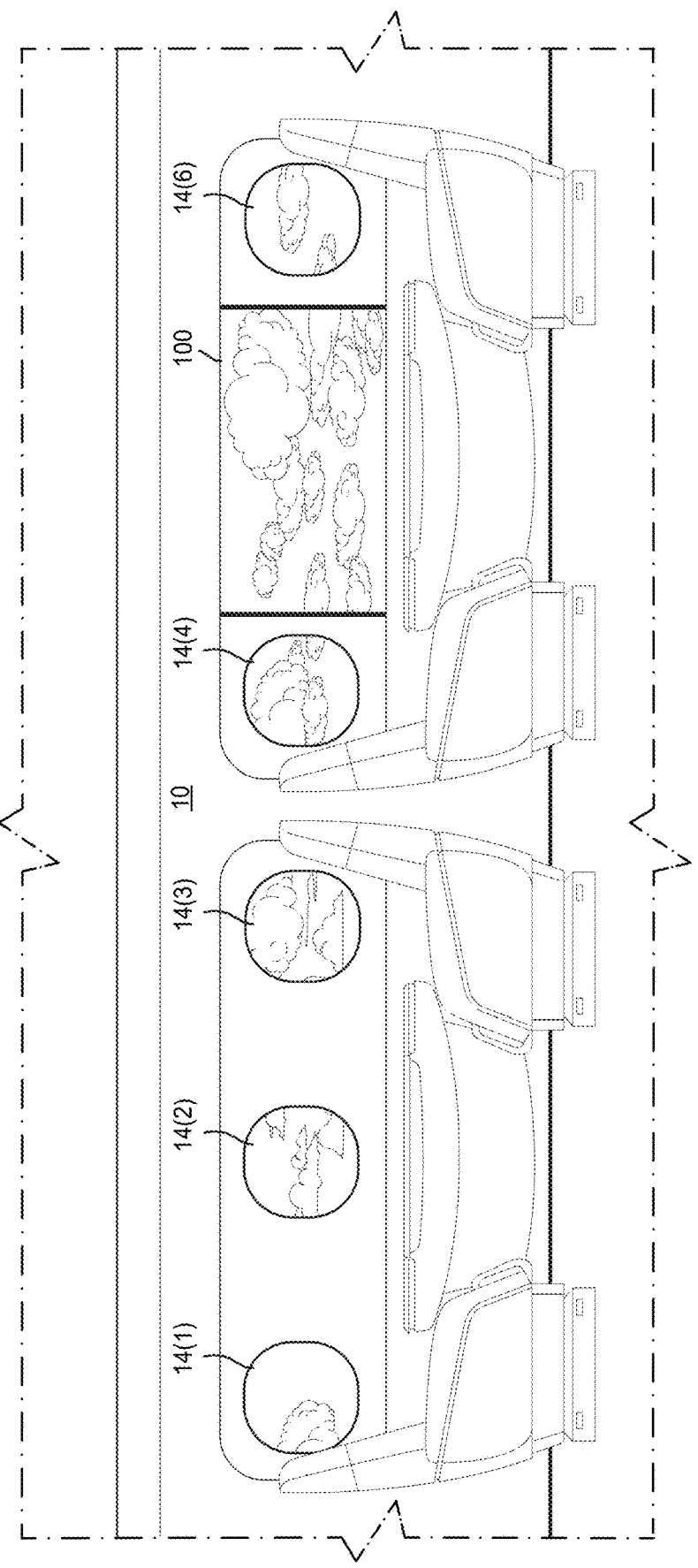
FIG. 3 shows an aircraft interior including smart window providing a full window simulation without an interactive user interface displayed.

Mimetic Panel: A mimetic panel function configures the display image to mimic transparency, even when the display itself is not transparent. In other words, in example embodiments, the mimetic panel function controls a virtual window to mimic or imitate the appearance of a physical window at the location of the virtual window. There are several different ways and embodiments to accomplish this, for example:

(1) the virtual window is located in proximity to one or two physical windows (e.g., between two physical windows in some embodiments). As best seen in FIG. 3, the virtual window displays a different part of the same environment the user can see through the physical windows. For example, if the user can see a cloudscape through lefthand and righthand physical windows, the virtual window will display a part of the same cloudscape so it appears to be a seamless visualization of same vista the user can see through the physical windows. Thus, when the user can see 3D cloud object shapes through the physical windows, the virtual window displays those same cloud object shapes projected onto the virtual window. Such a project can be obtained by capturing images from the image plane of a camera (see FIG. 12) and/or generating synthetic/artificial graphics that correspond to and/or are compatible with and/or match and/or fill in gaps between and/or complete and/or interpolate between and/or fill in missing information between, the images the user can see through the physical windows.

(2) In some embodiments, sensed position of one or more passengers within the aircraft and/or head tracking and/or gaze tracking can be used to alter the viewing perspective (viewpoint) of the virtual window display, in order to change or transform the projection of the image onto the virtual window. This allows the virtual window to mimic 3D effects a user would see when looking through a physical window from different positions or perspectives.

(3) Alternatively or in addition, the virtual window can display content appropriate for or compatible with its location, size and/or orientation relative to the aircraft fuselage. For example, since the virtual window in one embodiment is located on the side of the aircraft fuselage, the virtual window can be controlled to display scenes that can or could be seen through a physical window located on the side of the aircraft. When the aircraft is in level flight, such display could show the sky, clouds, a distant horizon including mountains, etc. When the aircraft is banking, such display could show a view of the ground at an appropriately angled perspective that changes with the aircraft's roll angle if the roll angle is toward the virtual window position, or the display could show a view of the sky overhead at an appropriately angled perspective that changes with the aircraft's roll angle when the roll angle is away from the virtual window position. In such examples, the virtual display content would be controlled by pitch/yaw/roll orientation control and/or sensor signals that match the aircraft's current orientation. The virtual window could be regarded as defining a viewing frustum in 3D space and image sources can be defined or controlled so the virtual window displays whatever one would see through a physical window at the location of the virtual window.

(4) The scene the virtual window displays need not mimic a real world view. It could be a fanciful or imaginary or simulated changing scene that one might see outside the aircraft from the perspective of the virtual window as the aircraft changes its position on the ground and/or in flight.

(5) The virtual window can selectively be turned off to display black or null.

Example

FIG. 1 shows an example embodiment of an interior aircraft side wall panel ("side wall") 10 with a virtual window 100 providing an interactive user interface. In the example shown, the sidewall 10 is integrated as an interior part of an aircraft fuselage 12 in the aircraft cabin and covers the aircraft frame, aircraft wiring, ducting and insulation located along the length of the cabin. In the example shown, a number of traditional windows 14(1), . . . 14(4), 14(6) structurally attached cutout areas of the sidewall 10 and fuselage 12 provide environmentally-sealed views of the environment outside the aircraft. In a typical prior art configuration, an additional window 14(5) would be placed between window 14(4) and window 14(6). However, in this example embodiment, no physical window exists in that position between window 14(4) and window 14(6). Instead, virtual window 100 is placed at that position. As can be seen, virtual window 100 is larger in size and different in shape as compared to physical windows 14 (for example, the physical windows are oblong whereas the virtual window is rectangular, and the virtual window has a surface area that is some multiple (e.g., 4 to 5 times) the surface area of a traditional physical window. Virtual window 100 may be curved and conformal with the side wall panel 10 (see FIG. 11) so it creates the illusion of also being a window to the outside world. However, the virtual window 100 displays an entirely electronically generated image. In the example shown, this displayed electronic image is programmable and may be changed as desired.

According to embodiments of the present invention, alternatively, a physical window 14(5) may exist between window 14(4) and window 14(6) and the virtual window may be placed over this physical window 14(5).

Figure 12:
FIG. 12 shows a rear view of the sidewall interior panel including an integrated camera and electronics. Such a camera is an external camera to capture externa images. The position of this camera is just representative, since the camera may be installed in other positions.

For example, virtual window 100 as shown may be mimetic and displays an image of the environment outside the airplane (in this case a cloudscape) that would be seen through a physical window at that position. In this example, from the user standpoint the virtual window 100 displays another part of the same cloudscape that can be seen though adjacent physical windows 14(4), 14(6). Such an image can be captured with one or more cameras mounted on an outside surface of the sidewall panel 10 and aimed outwards through an opening of the aircraft fuselage (as shown in FIG. 12) to provide a displayed image of the same quality, perspective, illumination level, field of view, etc. as would be seen through a physical window at that location on the aircraft's fuselage. However, as explained below, this image is changeable and manipulatable, and other or different images such as synthesized/virtual images can be substituted and/or superimposed as desired. The image the virtual window 100 displays can be a 2D image or a 3D image.

The virtual window 100 shown in FIG. 1 further includes a visual user interface superimposed on top of the camera-captured cloudscape image. This visual user interface can comprise any configuration of any number of virtual objects such as buttons, play buttons, indicators, icons, sliders, fillable text fields, directional controls, video frames, etc. In example embodiments, the virtual window 100 comprises a touch screen or has a touch surface, and a user can actuate controls such as buttons, play buttons, sliders, etc. by touching corresponding positions on the virtual window. Manipulating such controls can change the display of the virtual window 100 and/or can perform other functions such as controlling the cabin environment lighting/heating, perform communication/collaboration functions, display entertainment information, interact with the internet or other network, interact with artificial intelligence, or any other function. The user interface can be selectively turned off so the virtual window 100 can present the same image as would be seen if it were a physical window cutout through the aircraft fuselage. See FIG. 3.

Figure 2:
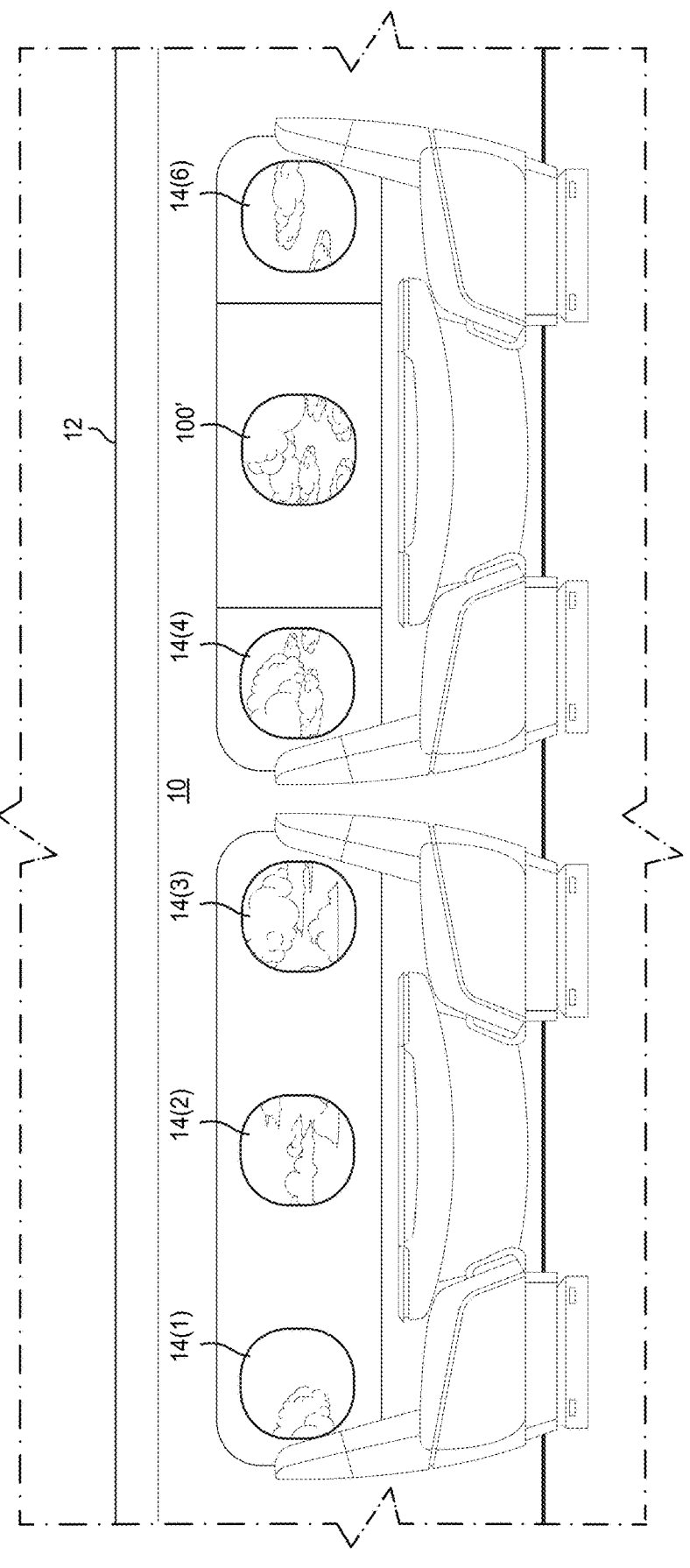
FIG. 2 shows an aircraft interior including a smart window providing a regular window simulation (mimetic panel).

FIG. 2 shows where the virtual window 100' is structured or programmed to simulate a physical window 14. This option combines real-time external view camera images with a software-generated window mask to precisely replicate the standard internal window layout configuration. The same structure shown in FIG. 1 can be used to provide the display shown in FIG. 2.

Use of virtual (simulated) outside reality displayed and or overlayed onto actual reality in the virtual window. In other words, if, as an alternative, the outside cameras would not exist or of visibility is low, a simulated reality can be displayed on the virtual window independent of environmental factors such as actual visibility, time of day, season, altitude, flight attitude and location.

Figure 9:
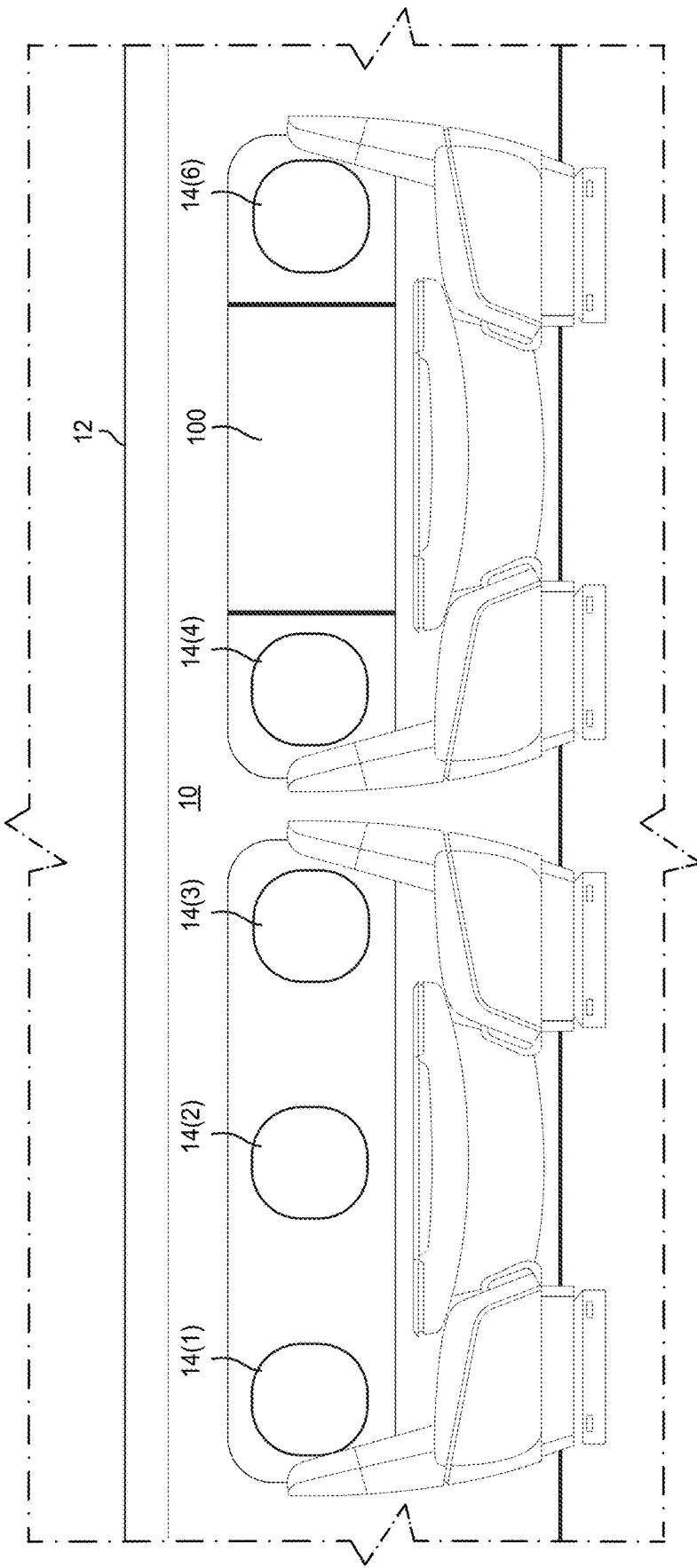
FIG. 9 shows a sidewall with a smart window (turned off) together with a club seat arrangement.
Figure 10:
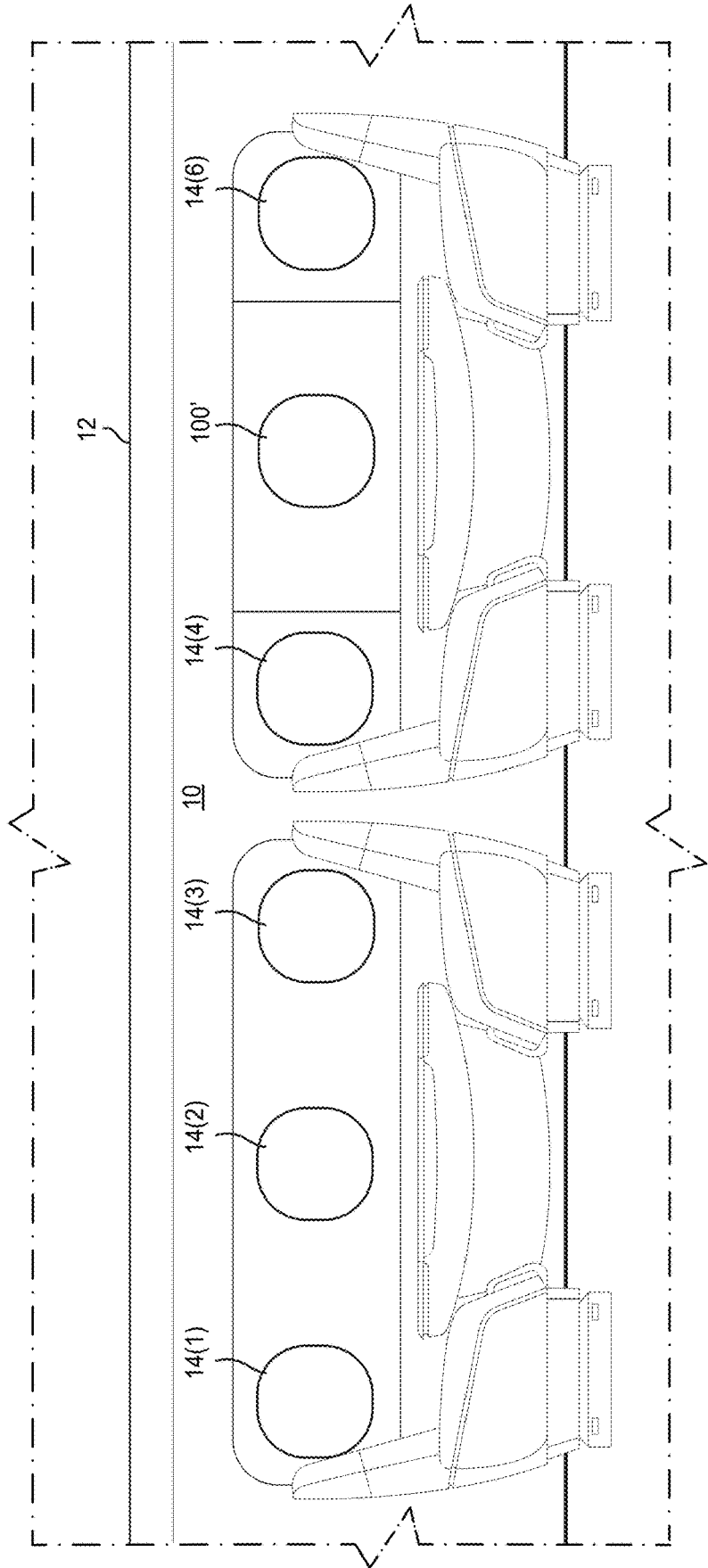
FIG. 10 shows a sidewall with one smart window providing regular window simulation ("mimetic functionality") together with a club seat arrangement (this is the same arrangement of FIG. 2).

FIGS. 9 & 10 show that virtual window 100, 100' could be selectively turned off or display black (or a night scene) to match or mimic what the user sees through the physical windows 14.

Here's how this functionality in example embodiments works:

Simulated Reality Independent of Environmental Factors: Regardless of external conditions like poor visibility or time of day, the system may generate and display a virtual outside environment. This means passengers can experience a simulated reality that isn't reliant on the actual conditions outside the aircraft.

Utilization of Enhanced External Camera Images: The system may take advantage of external camera images, which may be enhanced or combined with other visual elements. These images serve as the basis for simulating various environments.

Simulating Different Environments: The system can simulate diverse environments by blending external camera images with additional data. For instance, it can display (on the virtual window) data from a different flight or create an entirely different external reality, matching the perceived speed and flight movements. This is achieved by synchronizing the flight data with pre-recorded external environment data, effectively providing a flight simulation within an alternative reality.

This functionality allows for a dynamic and immersive experience by seamlessly integrating simulated outside realities with actual views from the aircraft window. It ensures that passengers can enjoy captivating and engaging visuals, even when external factors might limit the visibility or when simulating entirely different flight scenarios.

The example technology herein also brings the following important technical advantage: In the prior art, IFE (In Flight Entertainment) monitor sizes have been limited by the size of bulkheads. On the other hand, the example technology herein creates the opportunity to install larger monitors not traditionally offered on smaller aircraft. Example embodiments notably introduce a virtual window system with an enlarged size, thereby circumventing the need for intricate structural elements and additional aircraft weight. As a virtual construct, this enlarged window's dimensions can be expansively customized without influencing the fuselage's structural integrity. This innovation successfully overcomes the constraints imposed by physical window dimensions, permitting the integration of an expansive virtual window that does not compromise the aircraft's structural stability. In one embodiment, the virtual window is substantially larger than a physical window defined through the fuselage could be as a practical matter (e.g., due to structural issues and other constraints as discussed above).

This design paradigm offers profound benefits, notably in assembly, maintenance, and reduction of part numbers. The amalgamation of functionalities within a single or unified/integrated virtual interface reduces the need for disparate components, simplifying cabin configuration and resulting in streamlined installation and maintenance processes. This, in turn, enhances operational efficiency and reduces complexity, both during initial assembly and ongoing maintenance activities.

Complementing all explanation above, one non limiting embodiment of the SMART WINDOW SYSTEM may comprise:

Virtual Window Configuration: The system features at least one virtual window 100 equipped with a curved electronic display (see FIG. 11). This virtual window 100 is strategically positioned between two physical windows 14, integrated within the club seat configuration. Surrounding this virtual window 100 are at least two traditional physical windows 14, ensuring a harmonious blend of real and simulated views. The curved electronic display may use OLED, LCD, FOLED or other technology.

External Camera Setup: To simulate real window views accurately, the system incorporates at least one external camera 200 positioned below the actual aircraft windows. See FIG. 12. Alternatively, at least one external camera 200 may be positioned in any other position. These cameras are strategically placed to replicate the same angles and perspectives as those seen through the genuine windows.

Figure 4:
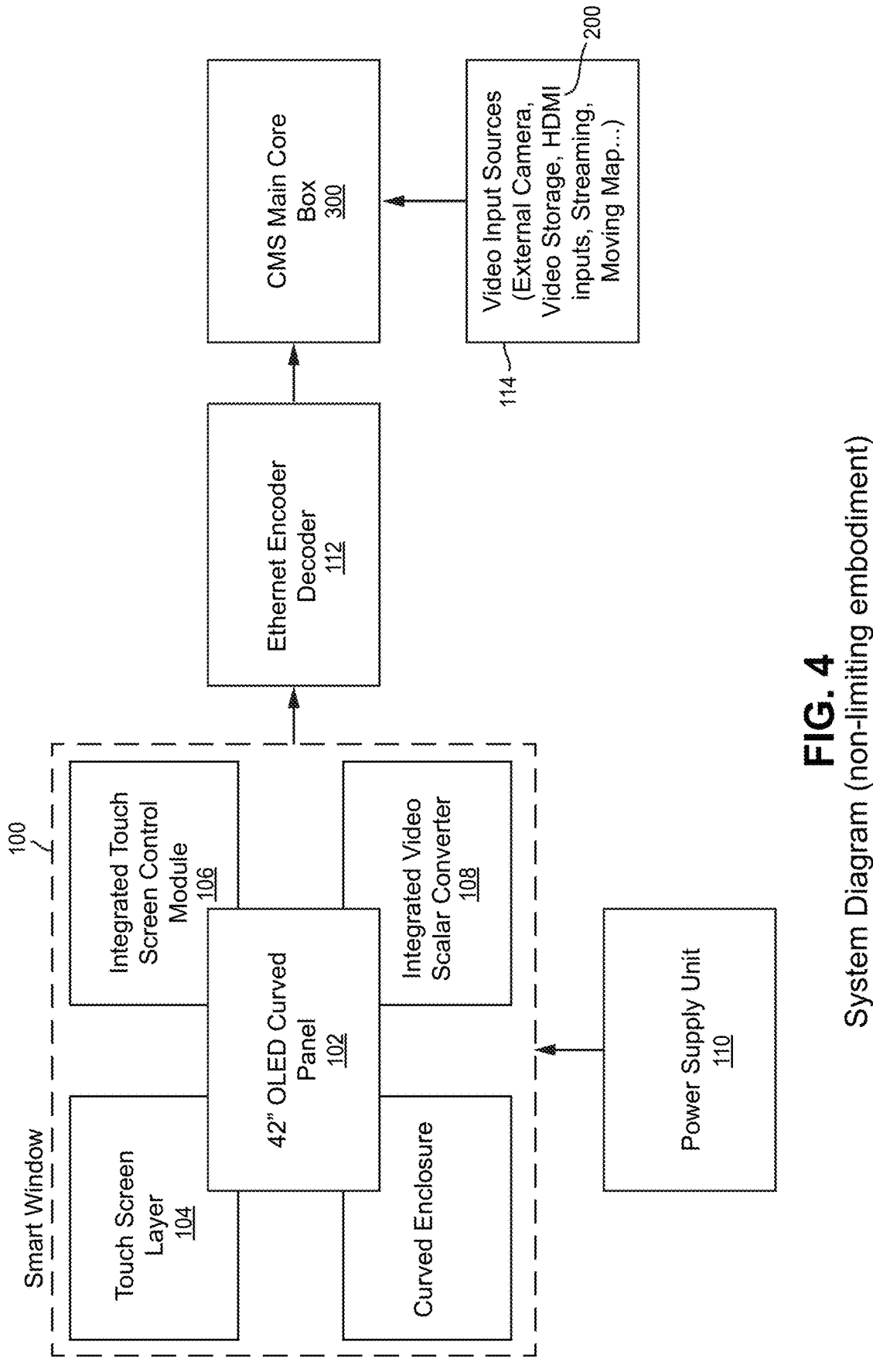
FIG. 4 is a block diagram of a System Diagram of a non limiting embodiment.

Central Management System (CMS) Main Core Box 300 (see FIG. 4): Responsible for the core functionalities of the smart window system, the CMS Main Core Box 300 takes charge of processing information and controlling various interfaces. It manages the following components:

Curved OLED Panel 102 (if OLED technology is used): The heart of the virtual window display, the Curved OLED panel creates realistic visual representations.

Touchscreen Layer 104: This layer enables intuitive touch-based interactions with the virtual window, enhancing user engagement.

Integrated Touchscreen Control 106: Seamlessly integrated within the system, this control unit facilitates user-friendly and responsive touch interactions.

Integrated Video Scalar Converter 108: Responsible for optimizing video quality and resolution, ensuring a high-quality visual experience.

Power Supply 110: Providing the necessary electrical power to all system components for uninterrupted operation.

System Connectivity: The SMART WINDOW SYSTEM is interconnected with various key elements, comprising:

Ethernet Encoder-Decoder 112: Facilitating data communication and encoding/decoding processes.

Video Input Sources 114: This includes external cameras, video storage, HDMI inputs, streaming capabilities, and Moving Map functionality, ensuring a wide range of visual content sources.

Figure 4A:
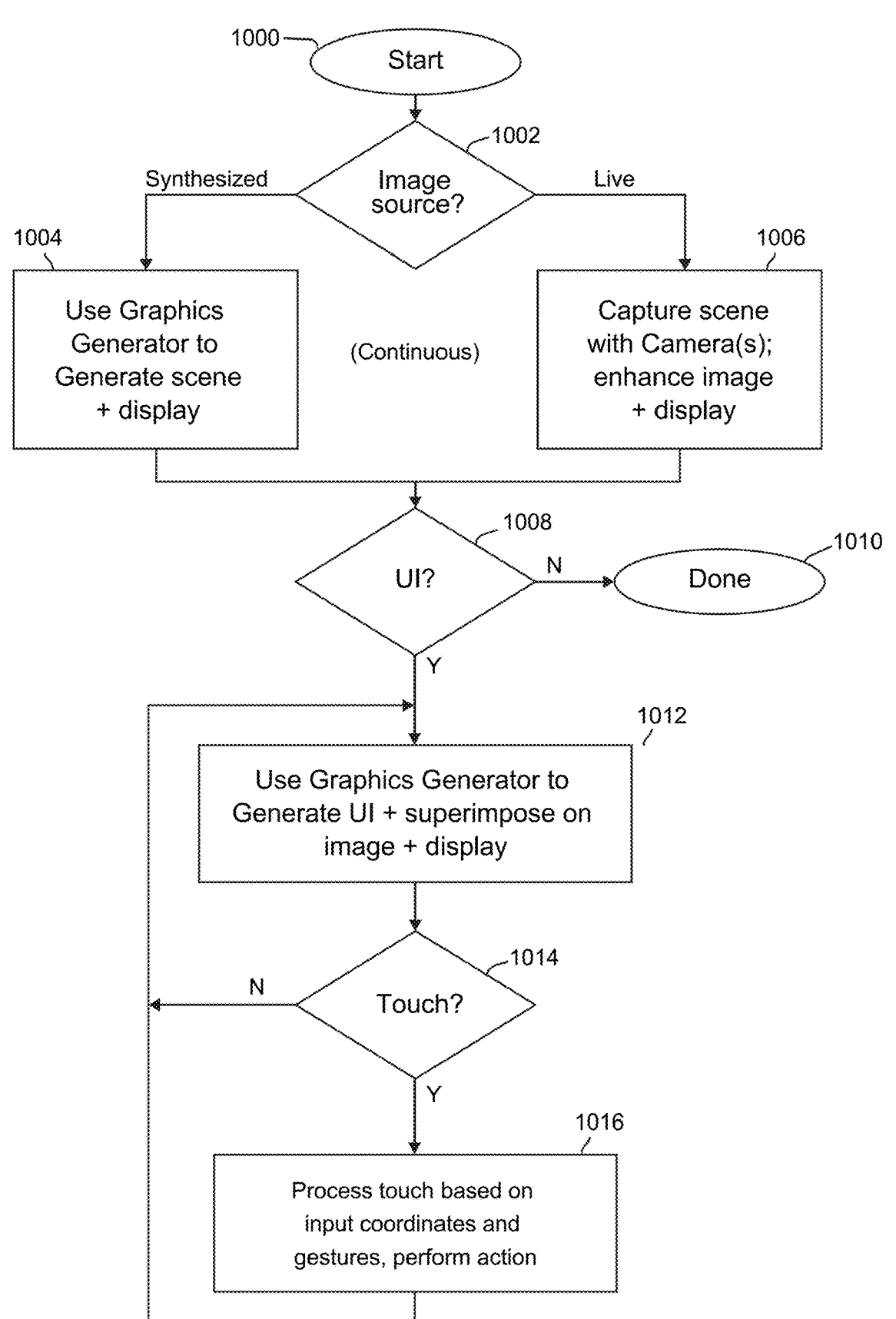
FIG. 4A is a flowchart of example control steps performed by the FIG. 4 system.
Figure 11:
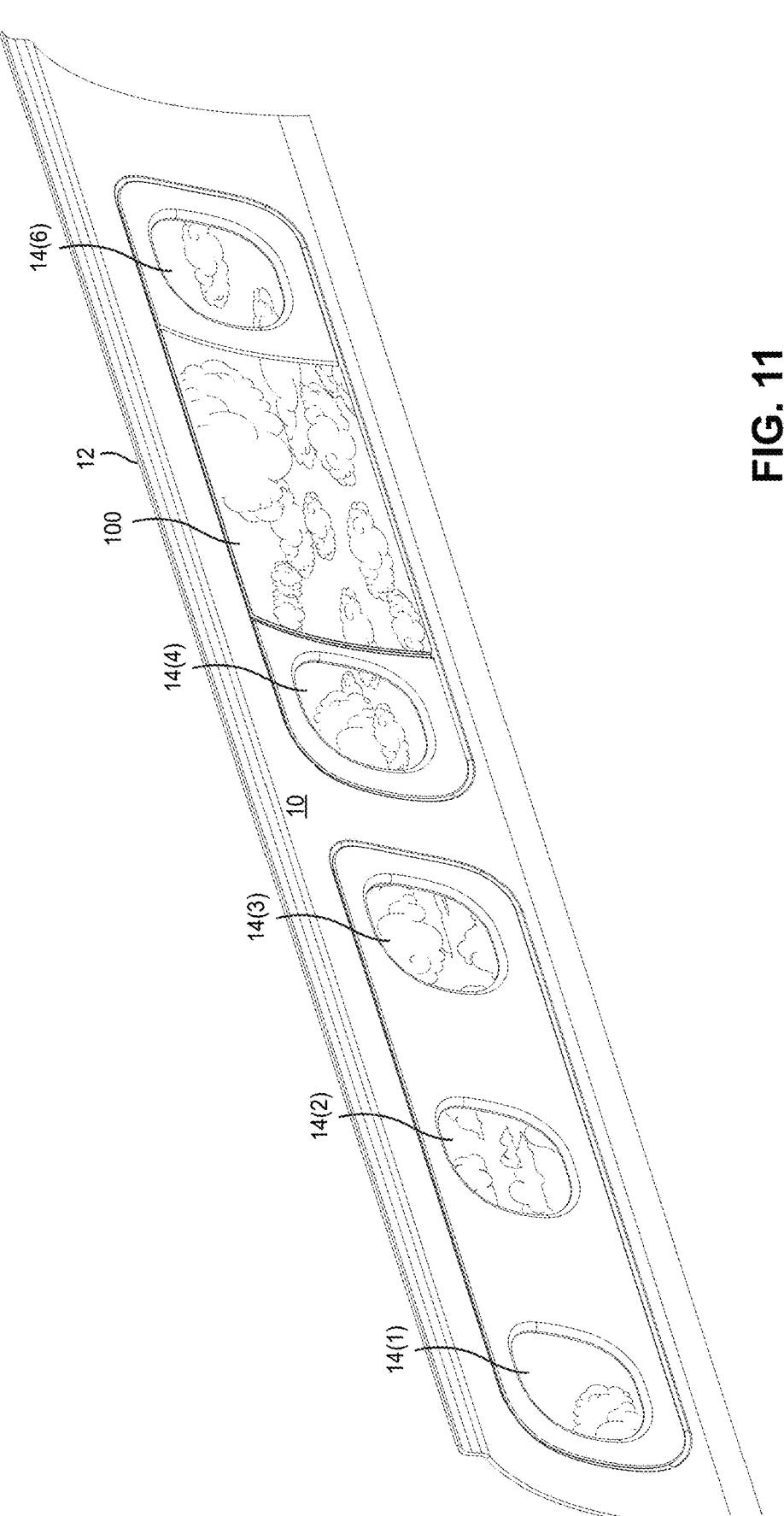
FIG. 11 shows a top perspective view showing integration of a curved display with a sidewall interior panel of an aircraft.

FIG. 4A is a simplified flowchart of steps performed by Central Management System (CMS) Main Core Box 300. These steps may be performed for example by one or more CPUs, processors and/or processing circuits, e.g., executing software instructions stored in non-transitory memory. In the example shown, the Core Box 300 first determines (decision block 1002) whether the display will be of a live environment (right-hand branch) or a synthesized environment (left-hand branch). If a synthesized environment (block 1004), the Core Box 300 uses a graphics generator (e.g., one or more graphics processing units including one or more graphics pipelines and/or a CPU running graphics shader software) to generate a synthetic scene for display on virtual window 100 based on any of a variety of inputs including for example flight status, outside light conditions, geolocation, etc. If a live environment (block 1006), the Core Box 300 captures live video from a camera as shown in FIG. 11 and, after possible image enhancement and/or transformation (e.g. as processed by scalar converter 108), displays the live video on the virtual window 100.

The Core Box 300 then determines whether a graphical user interface (UI) will be superimposed on the display (decision block 1008). If so, then Core Box 300 uses the aforementioned graphics generator to generate and display a UI such as shown in FIG. 1 superimposed on the live or synthesized display (block 1012). If a UI is displayed, then Core Box 300 determines if a user is touching touch screen layer 104 of the virtual window 100 (decision block 1014). If the user is touching the touch screen layer 104 of the virtual window 100 (Y exit to decision block 1014), the Core Box 300 processes the touch by determining its coordinates (and any gestures) from Integrated Touch Screen Control Module 106 and performs an associated operation or function (block 1016). Such function could include displaying additional or different content e.g., in display windows on the virtual window 100 such as stored video, HDMI inputs, streaming content, moving map, etc.

This embodiment demonstrates a comprehensive configuration of the SMART WINDOW SYSTEM, which seamlessly integrates traditional physical windows, virtual window(s), external cameras, a central management system and system connectivity to deliver an immersive and dynamic passenger experience within an aircraft's club seat configuration.

FIG. 5 presents an aircraft sidewall (which is installed in an aircraft cabin interior) having a traditional window configuration, according to the prior art. Therefore, not having a virtual window.

FIGS. 6-8 present an aircraft sidewall (which is installed in an aircraft cabin interior), according to the present technology, having some embodiments which comprise at least one virtual window 100 and some of which have multiple virtual windows 100(1), 100(2):

FIGS. 9 & 10 present an aircraft cabin interior, according to the present technology, comprising sidewall with at least one virtual window, together with a club seat arrangement. Note: The club seat arrangement comprises two seats and a table.

Figure 11A:
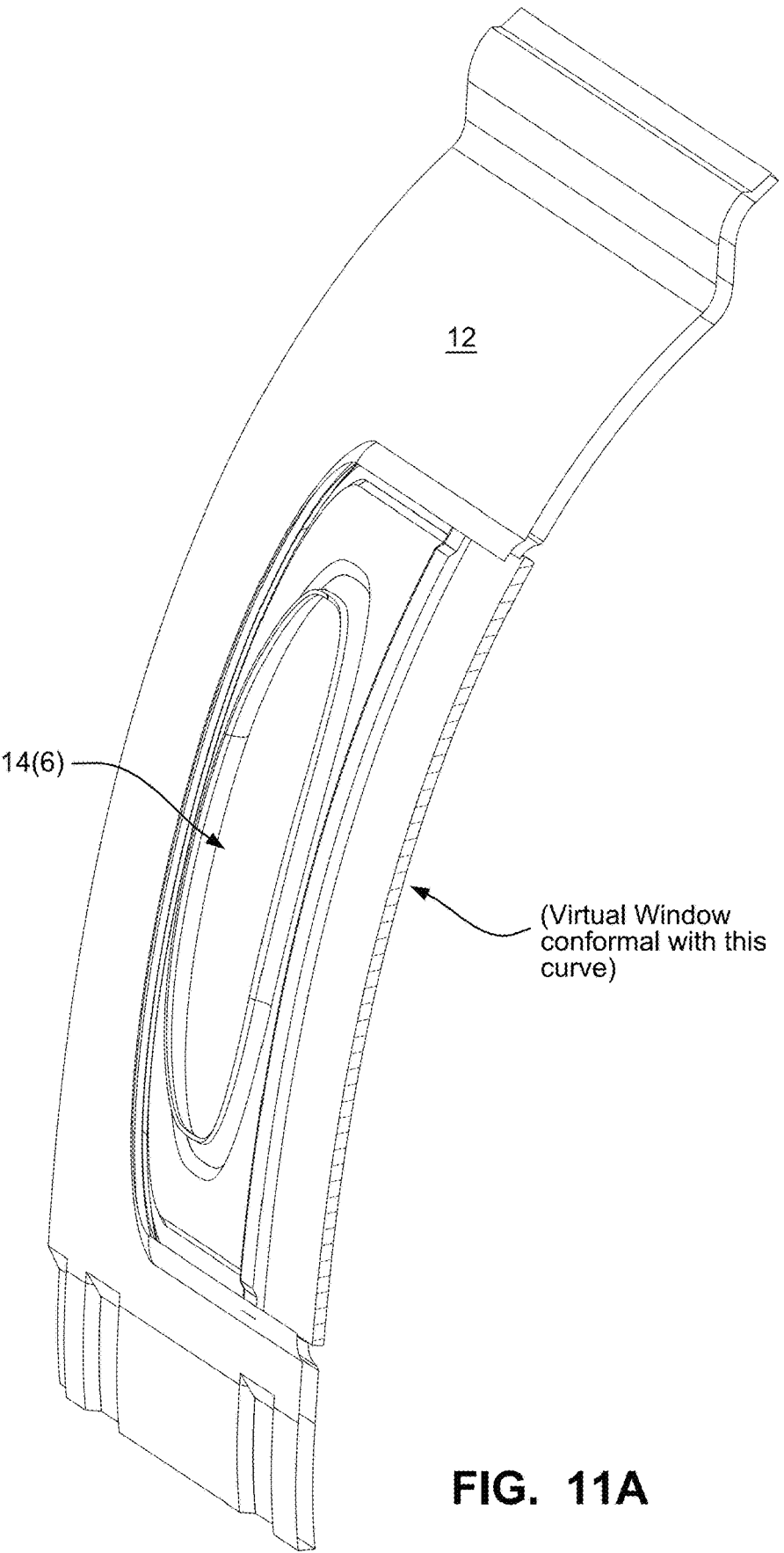
FIG. 11A shows a cross-sectional view of the sidewall interior panel attached to the aircraft fuselage including a cutout window.

FIG. 11 shows a top perspective view of a virtual window integrated with a sidewall interior panel of an aircraft. FIG. 11A shows a cross-sectional view of the curved sidewall interior panel attached to the aircraft fuselage having a conventional cutout window therethrough. The virtual window provides a curved rectangular viewing surface that is conformal to the curve of sidewall interior panel as shown in FIG. 11A, with the curve of the viewing surface matching the curve of a window mask portion of the sidewall panel. Specifically, the curved display viewing surface from top edge to bottom edge (i.e., along its vertical extent) curves or bows away from the passenger (in one embodiment, OLED display technology enables this curved viewing surface shape). This curved shape conformally matches the curve profile of the indented, outwardly (toward fuselage) bowed out, window mask portion of the sidewall panel as shown in FIG. 11A. Such matching of curve profiles enables the curved viewing surface of the virtual window to visually appear to the passenger as matching the smaller viewing surfaces presented by scratch panes/transparent structures of the adjacent cutout windows, which are also mounted in the sidewall panel's same window mask portion. The virtual window display is fixedly mounted to the sidewall panel from behind (all mounting structures are hidden behind the display) so to the passenger, the curved display viewing surface of the virtual window optically appears to be an integral transparent glass or acrylic pane pressed into the window mask portion of the sidewall panel with no gaps (or minimal gaps) between—just like the adjacent window/ scratch panes set in pressure seal/spacers and associated window frames of adjacent cutout window structures that provide direct viewing through the sidewall panel window mask and the aircraft fuselage of the real world environment outside the aircraft.

Although the preferred embodiment of this technology is the installation of the virtual window on the sidewall, as demonstrated in the text and figures presented, other embodiments can be conceived in the same scope by applying the system and its functionalities through virtual window(s) positioned on other internal parts of the fuselage, including on the aircraft ceiling.

All patents and publications cited herein are incorporated by reference as if expressly set forth.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. An aircraft comprising:
a first window providing a view from within an aircraft interior, the first window formed by a first cutout through an aircraft fuselage;
a virtual window providing a view from within the aircraft interior, the virtual window comprising a display; and
processing circuitry connected to the virtual window, the processing circuitry controlling the virtual window to display a user interface with informative content and cabin controls;
wherein the virtual window comprises a touchscreen, and the virtual window is curved and conformal to a sidewall panel within the aircraft interior.

2. The aircraft of claim 1 wherein the informative content and cabin controls comprise information such as destination time, external and internal temperatures, flight altitude, speed, wind conditions, and key cabin controls derived from a Cabin Management System and In-Flight Entertainment system.

3. The aircraft of claim 1 wherein the virtual window is a virtual mimetic window comprising a touch screen, and the processing circuitry controls the virtual mimetic window to mimic a second window formed by a second cutout through the aircraft fuselage and is responsive to touch on the touch screen to control aspects of aircraft operation.

4. The aircraft of claim 1 wherein the virtual window is disposed adjacent the first window and the processing circuitry is configured to control the virtual window to display portions of real world objects that can be seen through the first window.

5. The aircraft of claim 4 further including a camera disposed on the aircraft, the camera capturing external images, the processing circuitry controlling the virtual window to display images based on the images captured by the camera.

6. The aircraft of claim 4 further including a graphics generator disposed on the aircraft, the graphics generator generating images of objects that can be seen through the first window, the processing circuitry controlling the virtual window to display the images generated by the graphics generator.

7. The aircraft of claim 6 wherein the graphics generator generates images of objects and/or views that could be captured by an external camera, the processing circuitry controlling the virtual window to display the generated images of objects and/or views.

8. The aircraft of claim 1 wherein the processing circuitry comprises a graphics generator that generates the user interface and superimposes the user interface on the virtual window.

9. The aircraft of claim 1 wherein the virtual window provides an active display area that is shaped and sized to match the first window.

10. The aircraft of claim 1 wherein structure defining the virtual window is not transparent and the virtual window mimics transparency.

11. The aircraft of claim 1 wherein the virtual window is disposed on a sidewall panel between the first window and a third window providing a view from within the aircraft interior, the third window formed by a third cutout through the aircraft fuselage, and the virtual window mimics what would be seen through a cutout window between the first window and the third window.

12. The aircraft of claim 1 wherein the processing circuitry controls the virtual window to visually simulate a physical window using real and/or synthetic images, the synthetic images including flight information, entertainment, and cabin controls, the virtual window being configured to integrate an interactive interface with touch, voice, gesture, and eye-tracking controls, the virtual window utilizing curved OLED panels with mimetic capabilities and integration with a cabin management system.

13. For use in an aircraft comprising a first window providing a view from within an aircraft interior through a first cutout through an aircraft fuselage, a virtual window comprising a display configured to provide a view from within the aircraft interior, the virtual window view mimicking a further window formed by a further cutout through the aircraft fuselage, wherein the virtual window comprises a display that is curved and conformal to a sidewall panel within the aircraft interior.

14. The virtual window of claim 13 wherein the virtual window is configured to be disposed between the first window and a second window providing a view from within the aircraft interior through a second cutout through an aircraft fuselage, and the virtual window is further configured to display objects visible through the first window and to display objects visible through the second window.

15. The virtual window of claim 13 further including a camera disposed on the aircraft, the camera capturing external images, the virtual window configured to display images based on the external images the camera captures.

16. The virtual window of claim 13 further including a graphics generator generating images of objects visible through the first window or captured by an external camera, the virtual window being configured to display images generated by the graphics generator.

17. The virtual window of claim 13 wherein the virtual window is configured to display a superimposed user interface.

18. The virtual window of claim 13 wherein the virtual window is configured to provide a display that mimics or imitates what could be seen through a second window formed by a second cutout through the aircraft fuselage.

19. The virtual window of claim 13 wherein the virtual window is configured to provide a display that mimics or imitates what could be seen through an external camera.

20. The virtual window of claim 13 wherein the virtual window comprises an active display area that is shaped and sized to match the first window.

21. The virtual window of claim 13 wherein structure defining the virtual window is not transparent and the virtual window mimics transparency.

22. The virtual window of claim 13 wherein the virtual window is configured to be disposed on a sidewall panel between the first window and a second window providing a view from within the aircraft interior, the second window formed by a second cutout through the aircraft fuselage, the virtual window configured to mimic what would be seen through a window between the first window and the second window.

23. The virtual window of claim 13 wherein the virtual window is configured to provide a mimetic panel function controlling the virtual window to mimic or imitate the appearance of a physical cutout window at the location of the virtual window and to display real world images that would be seen through the physical cutout window at the location of the virtual window.

\*   \*   \*   \*   \*